United States Patent
Sato et al.

(10) Patent No.: US 6,717,640 B2
(45) Date of Patent: Apr. 6, 2004

(54) REFLECTION-TYPE LIQUID CRYSTAL DISPLAY DEVICE HAVING PARTITION WALL BETWEEN LIQUID CRYSTAL LAYERS AND LIGHT SCATTERING LAYER

(75) Inventors: Eiji Sato, Nara (JP); Yasuhisa Itoh, Nara (JP); Kiyoshi Minoura, Nara (JP); Tomoko Teranishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/225,466

(22) Filed: Aug. 22, 2002

(65) Prior Publication Data

US 2003/0043334 A1 Mar. 6, 2003

(30) Foreign Application Priority Data

Aug. 22, 2001 (JP) .................................. 2001-251985
Jul. 2, 2002 (JP) .................................. 2002-193134

(51) Int. Cl.⁷ ............................................ G02F 1/1335
(52) U.S. Cl. ........................ 349/112; 349/115; 349/74
(58) Field of Search ............................. 349/74–80, 112, 349/115

(56) References Cited

U.S. PATENT DOCUMENTS

| | | | | |
|---|---|---|---|---|
| 5,539,548 A | * | 7/1996 | Yamazaki et al. | 359/53 |
| 6,147,726 A | * | 11/2000 | Kubota et al. | 349/74 |
| 6,356,323 B1 | * | 3/2002 | Petruchik | 349/74 |
| 6,512,559 B1 | * | 1/2003 | Hashimoto et al. | 349/74 |

OTHER PUBLICATIONS

Fergason; "Liquid Crystals in Nondestructive Testing", Applied Optics, vol. 7, No. 9, pp. 1729–1737, Sep. 1968.
Berreman et al; "Bragg Reflection of Light from Single-–Domain Cholesteric Liquid–Crystal Films"; Physical Review Letters, vol. 25, No. 9, pp. 577–581, Aug. 31, 1970.

* cited by examiner

Primary Examiner—James Dudek
Assistant Examiner—Andrew Schechter
(74) Attorney, Agent, or Firm—Nixon & Vanderhye, P.C.

(57) ABSTRACT

The reflection-type liquid crystal display device includes two liquid crystal layers for selectively reflecting light in a specific wavelength range, and a partition wall interposed between the liquid crystal layers so as to separate the liquid crystal layers from each other. The partition wall serves as a scattering layer having a light scattering function.

14 Claims, 9 Drawing Sheets

SCATTERING PROFILE IN ①

SCATTERING PROFILE IN ②

SCATTERING PROFILE IN ③

PIXEL REGION IN BRIGHT DISPLAY STATE | PIXEL REGION IN DARK DISPLAY STATE

FIG. 8B
(Prior Art)

PIXEL REGION IN BRIGHT DISPLAY STATE | PIXEL REGION IN DARK DISPLAY STATE

REFLECTION-TYPE LIQUID CRYSTAL DISPLAY DEVICE HAVING PARTITION WALL BETWEEN LIQUID CRYSTAL LAYERS AND LIGHT SCATTERING LAYER

BACKGROUND OF THE INVENTION

1. Field of the Invention

The present invention generally relates to a reflection-type liquid crystal display device (LCD) for providing display by reflecting light incident from the outside. More particularly, the present invention relates to a reflection-type LCD having at least two liquid crystal layers for selectively reflecting light in a specific wavelength range.

2. Description of the Background Art

At present, liquid crystal display devices (LCDs) characterized by thin thickness, light weight and the like are practically used as color display devices in applications like office automation (OA) equipments (such as word processors and notebook computers), various video equipments, and game-playing equipments. Especially, a transmission-type LCD having a light source at the back (backlight) is used in a wide variety of fields because of the above characteristics.

Unlike the transmission-type LCD, a reflection-type LCD requires no backlight for display, thereby enabling reduction in power consumption for a light source. Moreover, since the space for the backlight is not required, the weight and thickness can further be reduced. The reflection-type LCD thus enables reduction in power consumption and therefore is suitable for lightweight, thin equipments. It is now assumed that an equipment having the transmission-type LCD and an equipment having the reflection-type LCD have the same operation time. The reflection-type LCD does not require the space and weight of the backlight and consumes a smaller amount of power. Therefore, a smaller battery can be used in the reflection-type LCD, thereby enabling further reduction in size and weight. Alternatively, provided that the equipment having the transmission-type LCD and the equipment having the reflection-type LCD have the same size or weight, a battery with a greater capacity can be used in the reflection-type LCD, whereby significant improvement in operation time can be expected.

In terms of display contrast characteristics, display devices such as CRT (Cathode Ray Tube) as a light-emitting display device are subjected to significant reduction in contrast when they are used outdoor in the daytime. Even in a transmission-type LCD subjected to an anti-reflection process, significant reduction in contrast is inevitable if the intensity of ambient light such as direct sunlight is much higher than that of display light. On the other hand, in the reflection-type LCD, display light is proportional to the amount of ambient light. Therefore, the reflection-type LCD can be used in a preferable manner particularly in outdoor applications such as portable information terminal, digital camera, and portable video camera.

The reflection-type LCDs thus have a very promising field of application. However, the reflection-type LCDs that are currently used in practical applications have a low reflectance (the ratio of reflected light intensity to incident light intensity). Therefore, display provided by the reflection-type LCDs is not bright enough. Such a low reflectance is mainly caused by the following factor: the reflection-type LCDs that are currently used in practical applications use one or twopolarizers whether they are of TN (Twisted Nematic) type or STN (Super Twisted Nematic) type. These polarizers absorb 50% or more of incident light. The absorbed light will not be used for display, causing light losses.

In view of this, a reflection-type LCD having a liquid crystal layer for selectively reflecting light in a visible light range (a liquid crystal layer having a helical structure such as a cholesteric liquid crystal layer) is conventionally proposed as a reflection-type LCD using no polarizer.

The phenomenon that this cholesteric layer selectively reflects light at a wavelength corresponding to its helical pitch is known in literatures (Appl. Opt. Vol. 7, 9, pp. 1729–1737 (1968) and Phys. Rev. Vol. 25, 9, pp. 577–581 (1970)) and the like. More specifically, provided that "no" and "ne" are a refractive index of a liquid crystal layer for ordinary ray and extraordinary ray, respectively, and "p" is a helical pitch, and "$\lambda$" is a reflection wavelength, a right-handed cholesteric liquid crystal layer selectively reflects only right-handed circularly polarized light components of incident light having a wavelength $\lambda$ (no·p<$\lambda$<ne·p), and allows right-handed circularly polarized light components at other wavelengths and all left-handed circularly polarized light components to transmit therethrough. A median reflection wavelength $\lambda$m is given by $\lambda$m=na·p, where "na" is an average refractive index of the liquid crystal layer. A left-handed cholesteric liquid crystal layer functions in the opposite manner to that of the right-handed cholesteric liquid crystal layer.

A typical example of a liquid crystal material having selective reflection characteristics is a cholesteric liquid crystal material. In order to use the selective reflection characteristics of the cholesteric liquid crystal material for display, the cholesteric liquid crystal material is commonly aligned in a planar state so that efficient selective reflection is realized. Accordingly, applying the planar-aligned cholesteric liquid crystal material to a reflection-type LCD would enable implementation of highly bright display in the regular reflection direction of a light source (the direction in which light from the light source reflects at the same angle as the incident angle).

However, reflected light intensity is reduced in an oblique direction with respect to the regular reflection direction of the light source. Moreover, the color of the reflected light varies toward a shorter wavelength as the incident angle or the reflection angle is increased. As a result, color purity of the reflected light is degraded as the viewing angle is increased. This phenomenon is called variation in hue. Moreover, if the reflected light intensity significantly varies depending on the viewing angle, that is, if the reflectance varies sharply, reflection characteristics like metallic luster texture are recognized if the display device is viewed from the regular reflection direction of the light source or a direction close to the regular reflection direction. This is not preferable in terms of display quality.

In view of the above problems, it is an object of the present invention to provide a reflection-type LCD having excellent visibility in a wide viewing-angle range.

SUMMARY OF THE INVENTION

According to the present invention, a reflection-type liquid crystal display device (LCD) includes at least two liquid crystal layers for selectively reflecting light in a specific wavelength range, and at least one partition wall interposed between the at least two liquid crystal layers so as to separate the liquid crystal layers from each other. Any one of the partition wall, a part of the liquid crystal layer which contacts the partition wall, and a part of the liquid crystal layer which contacts an alignment layer laminated to the partition wall serves as a scattering layer having a light scattering function. Whether the form of the "scattering layer" of the present invention can be distinguished or not does not matter as long as it has a light scattering function. For example, if individual domains of liquid crystal molecules in a region of a liquid crystal layer which is located near the interface between the partition wall and the liquid crystal layer are reduced in size by the influence of an alignment film or the like, scattering may occur between the domains. Provided that a part of the liquid crystal layer that contacts the partition wall has a light scattering function, this part of the liquid crystal layer serves as a "scattering layer" even if this part of the liquid crystal layer does not form a layer in the liquid crystal layer in a distinguishable form. Note that the "domain" herein refers to a region occupied by regularly aligned liquid crystal molecules.

According to the reflection-type LCD of the present invention, any one of the partition wall, a part of the liquid crystal layer which contacts the partition wall, and a part of the liquid crystal layer which contacts an alignment layer laminated to the partition wall serves as a scattering layer for scattering light. The light scattering function of the scattering layer causes scattering of not only incident light but also reflected light. Therefore, excellent visibility can be obtained not only in the regular reflection direction but also in a wide viewing-angle range. Moreover, since the reflectance changes gradually with a change in viewing angle, metallic luster of the display texture is suppressed.

Figure 12:
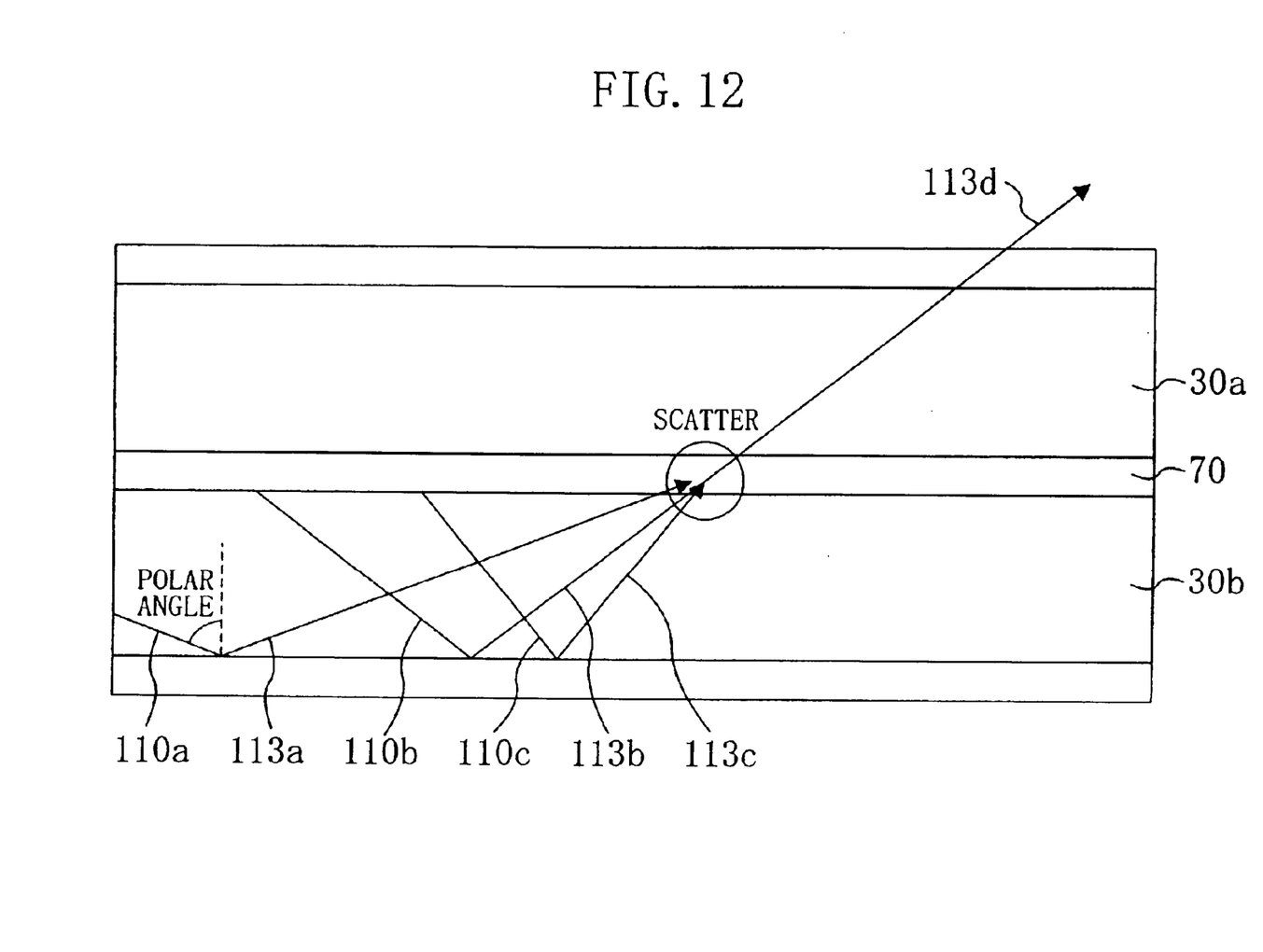
FIG. 12 illustrates the reason why variation in hue is reduced by the LCD of the present invention.

A liquid crystal layer that selectively reflects light in a specific wavelength range, e.g., a cholesteric liquid crystal layer, has such a property that the spectrum of selectively reflected light varies depending on the incident angle of light. In other words, as a polar angle of the incident light (tilt angle with respect to the normal of the substrate) is increased, the selectively reflected light is shifted toward a shorter wavelength. As shown in FIG. 12, providing a scattering layer 70 allows light 110a, 110b, and 110c to be incident on the liquid crystal layer 30b at various polar angles and to be reflected at the respective polar angles. Light 113a, 113b, 113c thus reflected is scattered again in the scattering layer 70. Of the scattered reflected light 113a to 113c, light components scattered in a certain direction are observed as combined light 113d. Therefore, the observed color is an average of various spectra. Accordingly, even if the display device is viewed in an oblique direction with respect to the normal direction of the substrate, perceived variation in hue toward a shorter wavelength is reduced as compared to the case of selective reflection without the scattering layer 70.

Moreover, the partition wall or the alignment layer provides a light scattering function. This eliminates the need to form a separate scattering layer, whereby increase in the number of parts, the number of steps in the manufacturing process and the manufacturing costs can be suppressed.

In the reflection-type LCD of the present invention, the at least two liquid crystal layers are preferably two or three liquid crystal layers. Preferably, the liquid crystal layers selectively reflect different specific wavelength ranges and have different threshold voltages. This enables implementation of four-color or eight-color display.

In the reflection-type LCD of the present invention, a scattered light intensity I ($\theta$) of the scattering layer is preferably distributed such that an average value of I (0°) to I (10°) is equal to or less than 500 times an average value of I (20°) to I (30°). "$\theta$" in the scattered light intensity I ($\theta$) is a light-receiving angle with respect to the direction in which parallel light from a light source travels straight. Therefore, the scattered light intensity I ($\theta$) indicates a scattered light intensity at the light-receiving angle $\theta$. Since the reflectance changes gradually with a change in viewing angle, metallic luster of the display texture can be suppressed.

DETAILED DESCRIPTION OF THE PREFERRED EMBODIMENTS

Hereinafter, embodiments of the present invention will be described with reference to the accompanying drawings. Unless otherwise mentioned, the following description will be given on the assumption that a chiral nematic liquid crystal material is used. However, the following description applies to the case where the chiral nematic liquid crystal material is replaced with a cholesteric liquid crystal material or a chiral smectic liquid crystal material. A simple matrix addressing-type LCD will be described in the following embodiments. However, the reflection-type LCD of the present invention is also applicable to an active matrix addressing-type LCD using a switching element. Examples of the switching element include a three-terminal element such as FET (Field Effect Transistor) like TFT (Thin Film Transistor), and a two-terminal element such as MIM (Metal-Insulator-Metal) and TFD (Thin Film Diode). It should be noted that the present invention is not limited to the following embodiments.

(First Embodiment)

Figure 1:
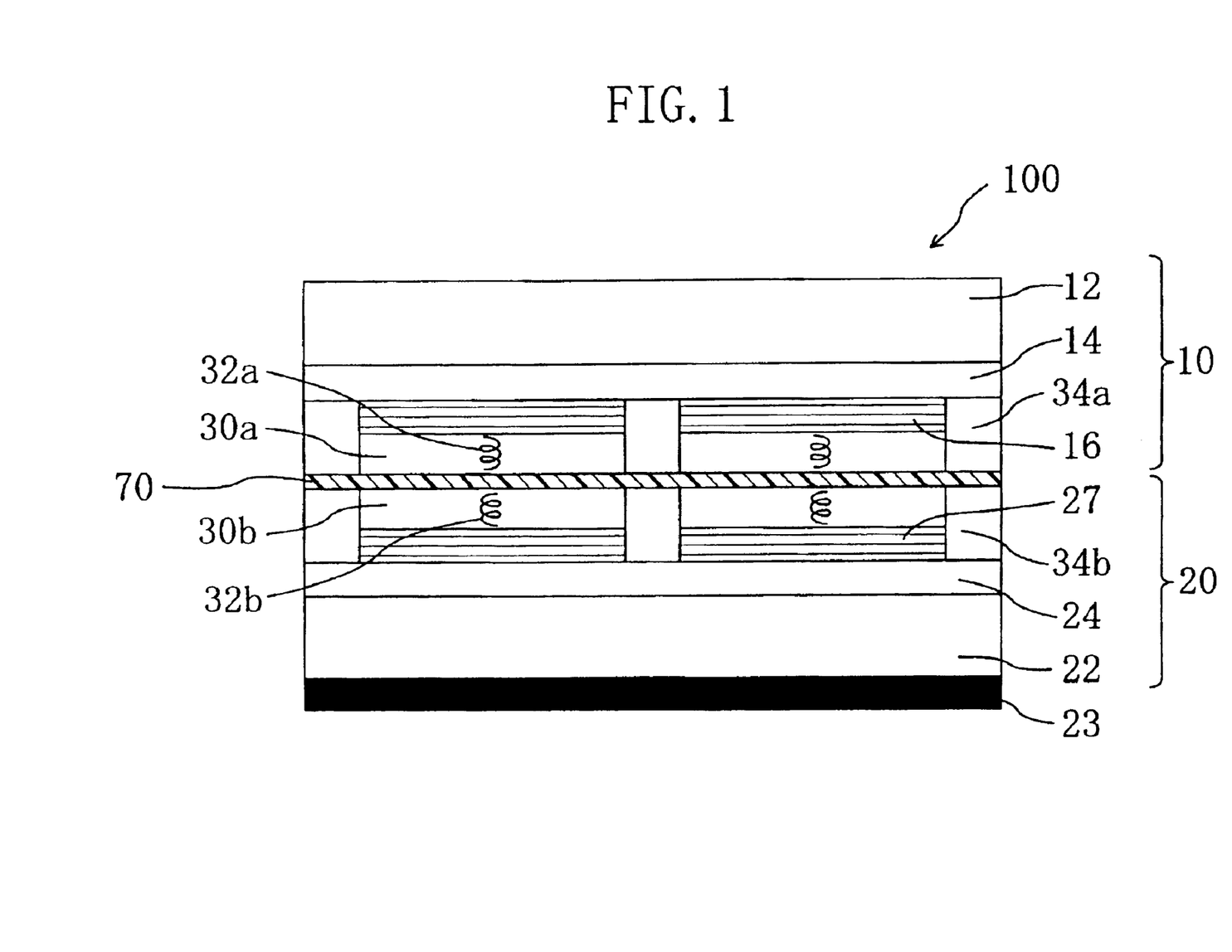
FIG. 1 is a schematic cross-sectional view of a reflection-type LCD 100 according to a first embodiment of the present invention.

FIG. 1 schematically shows a reflection-type LCD 100 of the first embodiment. The reflection-type LCD 100 has a first substrate 10, a second substrate 20, and a partition wall 70 interposed between the first and second substrates 10, 20. A chiral nematic liquid crystal layer 30a is provided between the first substrate 10 and the partition wall 70, and a chiral nematic liquid crystal layer 30b is provided between the second substrate 20 and the partition wall 70. The chiral nematic liquid crystal layer 30a selectively reflects left-handed circularly polarized light in a specific wavelength range. The chiral nematic liquid crystal layer 30b selectively reflects right-handed circularly polarized light in a specific wavelength range. Note that the reference numerals 32a, 32b in FIG. 1 schematically show the helical structure of the chiral nematic liquid crystal layers 30a, 30b, respectively.

Each substrate 10, 20 has a laminated structure. More specifically, a pair of electrodes 14, 24 and vertical alignment layers 16, 27 are sequentially laminated on corresponding transparent substrates 12, 22. The electrodes 14, 24 apply a voltage to the two liquid crystal layers 30a, 30b, respectively. The second substrate 20 has a light-absorbing layer 23 on the surface of the transparent substrate 22 that is located opposite to the liquid crystal layer 30b.

Natural light can be regarded as a combination of left-handed circularly polarized light and right-handed circularly polarized light. For example, when a single left-handed chiral nematic liquid crystal layer (which selectively reflects left-handed circularly polarized light) is used, the reflectance is at most 50%. In order to totally reflect incident light, laminating a left-handed chiral nematic liquid crystal layer and a right-handed chiral nematic liquid crystal layer (which selectively reflects right-handed circularly polarized light) would enable implementation of the reflectance of at most 100%. In this case, it is also possible to laminate two liquid crystal layers each interposed between a pair of substrates. However, since two substrates are present between the two liquid crystal layers, parallax will be produced.

The present embodiment uses a dielectric sheet as the partition wall 70 that separates the two liquid crystal layers 30a, 30b from each other. In order to reduce parallax and a drive voltage, the thickness of the dielectric sheet is preferably 30 μm or less, and more preferably 10 μm or less. The thickness of the dielectric sheet affects the drive voltage because the drive voltage applied between the pair of transparent electrodes 14, 24 is capacitively divided by electric capacitance of the liquid crystal layers 30a, 30b and electric capacitance of the dielectric sheet. For example, increasing the thickness of the dielectric sheet would reduce a voltage to be applied to the liquid crystal layers 30a, 30b. Therefore, in order to increase the voltage to be applied to the liquid crystal layers 30a, 30b to a prescribed value, a higher drive voltage must be applied between the pair of transparent electrodes 14, 24.

In the reflection-type LCD 100 of the present embodiment, the thickness of the two liquid crystal layers 30a, 30b is defined by columnar spacers 34a, 34b that can be formed on the corresponding transparent substrates 12, 22 with relatively high positional accuracy. Therefore, forming the columnar spacers 34a, 34b on the first and second substrates 10, 20 so as to face each other allows the partition wall 70 to be supported between the columnar spacers 34a, 34b. This enables the thickness of the liquid crystal layers 30a, 30b (i.e., cell gap) to be defined accurately. Moreover, since the partition wall 70 can be supported between the columnar spacers 34a, 34b, a relatively thin dielectric film cam be used as the partition wall 70. As a result, parallax can further be reduced and the drive voltage can be reduced.

Moreover, forming the columnar spacers 34a, 34b in a region other than a picture-element region, i.e., a region that does not contribute to display, enables improvement in numerical aperture and makes display less susceptible to disturbance of alignment of liquid crystal molecules in a region near the columnar spacers.

For example, the reflection-type LCD 100 is manufactured as described below. FIGS. 2A to 2E shows a series of cross-sectional views illustrating a manufacturing process of the reflection-type LCD 100.

Figure 2A:
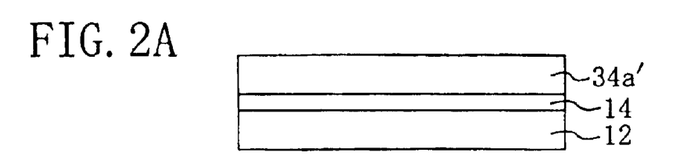
FIGS. 2A to 2E show a series of schematic cross-sectional views illustrating a manufacturing process of the reflection-type LCD 100 of the first embodiment.

As shown in FIG. 2A, a film such as ITO (Indium Tin Oxide) film having a thickness of 100 nm (1,000 Å) is formed on a transparent substrate 12 (e.g., glass substrate) by a sputtering method or the like. After a transparent electrode 14 of the ITO layer is thus formed, a photosensitive resin 34a' having a thickness of 5 μm is applied to the transparent electrode 14 by a spin coating method or the like. The photosensitive resin 34a' will later serve as columnar spacers 34a.

Figure 2B:
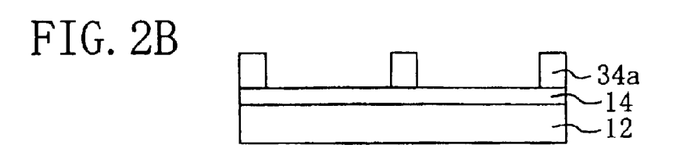

As shown in FIG. 2B, the photosensitive resin 34a' is patterned and baked by a photolithography process to form the columnar spacers 34a. In order to prevent reduction in numerical aperture and to make display less susceptible to disturbance of alignment of liquid crystal molecules in a region near the columnar spacers, it is preferable to pattern the photosensitive resin 34a' so as to form the columnar spacers 34a in a region outside the picture-element region.

Figure 2C:
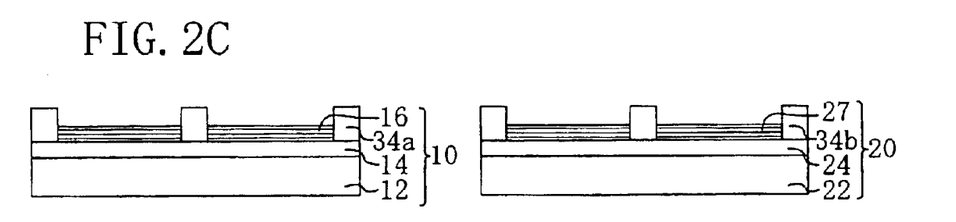

As shown in FIG. 2C, a vertical alignment layer 16 having a thickness of, e.g., 50 nm (500 Å) is formed on the transparent substrate 12 having the columnar spacers 34a formed thereon. The vertical alignment layer 16 is formed as follows: a vertical alignment agent, e.g., a silane coupling agent like DMOAP (N,N-dimethyl-N-octadecyl-3-aminopropyltrimethoxysilyl chloride), is applied by a spin coating method or the like and baked at about 300° C. for about sixty minutes. The first substrate 10 is thus completed. The second substrate 20 having a transparent electrode 24, columnar spacers 34b and a vertical alignment layer 27 formed on a transparent substrate 22 is prepared by the same steps as those described above in connection with FIGS. 2A to 2C. The columnar spacers 34b are preferably formed so as to face the columnar spacers 34a upon laminating the second substrate 20 to the first substrate 10 in a later step.

An ultraviolet (UV) curable resin having fine particles of titanium oxide (particle size: 1.3 μm) dispersed therein at about $3 \times 10^{16}/m^3$ is then applied with a thickness of 8 μm to a 7.5 μm-thick polyimide film by a spin coating method or the like. The UV curable resin is then cured by UV light. The resultant film is then subjected to a vertical alignment process to form the partition wall 70. This vertical alignment process eliminates the need to rub the partition wall 70 that is less durable against a rubbing process in view of its strength. If the partition wall is formed from a material that causes vertical alignment, no alignment process would be required. This is advantageous in terms of the manufacturing process.

Figure 2D:
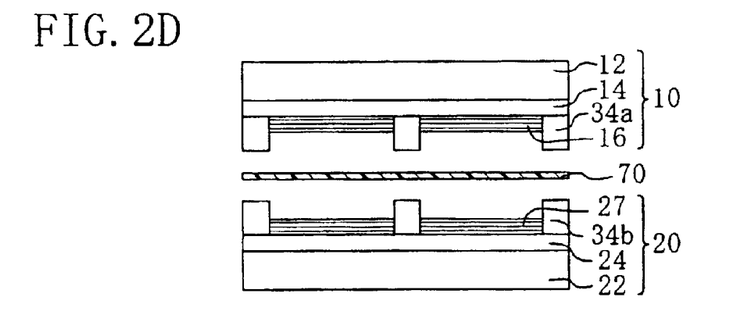

As shown in FIG. 2D, the partition wall 70 is laminated to the first substrate 10 and the second substrate 20 is then laminated to the partition wall 70.

Figure 2E:
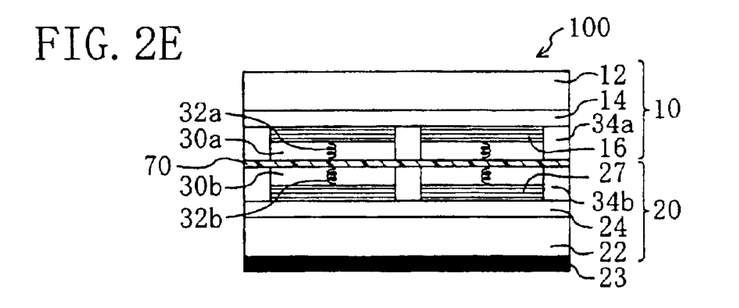

As shown in FIG. 2E, a liquid crystal material described later is introduced into the gap between the first substrate 10 and the partition wall 70 and the gap between the second substrate 20 and the partition wall 70, and the gaps are then sealed. The liquid crystal layers 30a, 30b are thus formed. A light-absorbing layer 23 for absorbing light in a visible light range is then formed outside the second substrate 20 (i.e., on the side opposite to the liquid crystal layer 30b). Note that the position of the light absorbing layer 23 and the timing of forming the light absorbing layer 23 are not limited to those described above. The light-absorbing layer 23 may be formed on the surface of the second substrate 20 that faces the liquid crystal layer 30b and may be formed at any time in the above process.

The liquid crystal layers 30a, 30b were herein formed from a chiral nematic liquid crystal material. More specifically, the liquid crystal layer 30a was formed from a mixture of nematic liquid crystal material E7 (made by Merck & Co., Inc) and 17.8 weight percents (wt %) of chiral agent S811 (made by Merck & Co., Inc), and the liquid crystal layer 30b was formed from a mixture of nematic liquid crystal material E7 and 17.8 wt % of chiral agent R811 (made by Merck & Co., Inc). The liquid crystal layer 30a has a left-handed helical structure, and selectively reflects left-handed circularly polarized light in a wavelength range centered about approximately 550 nm. The liquid crystal layer 30b has a right-handed helical structure, and selectively reflects right-handed circularly polarized light in a wavelength range centered about approximately 550 nm. The liquid crystal layers 30a, 30b are both green. The reflection-type LCD of the present embodiment is thus manufactured by the above process.

The partition wall 70 of the present embodiment serves also as a scattering layer having a light scattering function. Various methods may be used to form the partition wall 70 having the light scattering function. For example, the scattering layer having the light scattering function may be formed by dispersing titanium oxide particles within a transparent resin and applying the resultant resin to a support such as a polyimide film. Scattering characteristics of the scattering layer can be varied by varying the particle density, particle size, thickness of the scattering layer, refractive index of the resin, and the like.

In the present embodiment, a polyimide film having a resin layer with titanium oxide particles dispersed therein is used as the partition wall 70. Note that, as a first comparative example, a reflection-type LCD was manufactured in the same manner as that described above by using a partition wall having no light scattering function. A 15 $\mu$m-thick polyimide film subjected to a parallel alignment process was used as the partition wall having no light scattering function.

Figure 3:
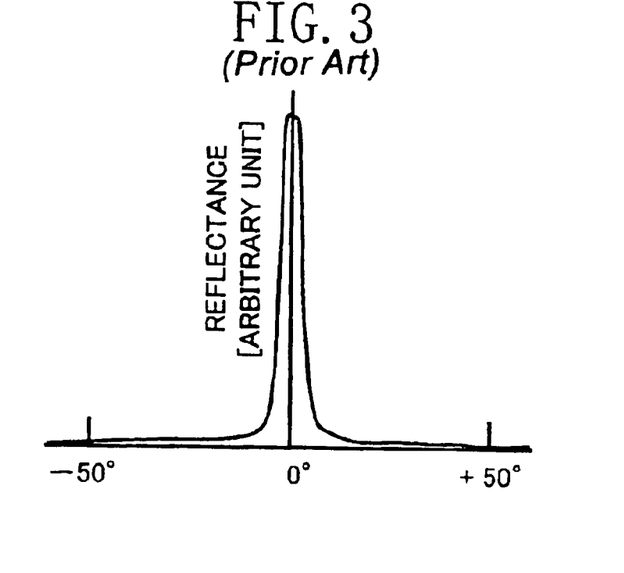
FIG. 3 shows angle dependence of the reflectance in a reflection-type LCD of a first comparative example.

According to the observation result of the reflection-type LCD of the first comparative example, each liquid crystal layer has a uniform, planar alignment surface and the reflecting surface has metallic luster. In the reflection-type LCD of the first comparative example, very bright display was able to be implemented within a limited viewing-angle range. However, when the reflection-type LCD of the first comparative example was viewed from an oblique direction with respect to the regular reflection direction, the reflected light intensity was significantly reduced and the color of the reflected light changed toward a shorter wavelength, causing variation in hue. FIG. 3 shows angle dependence of the reflectance in the reflection-type LCD of the first comparative example.

Figure 4:
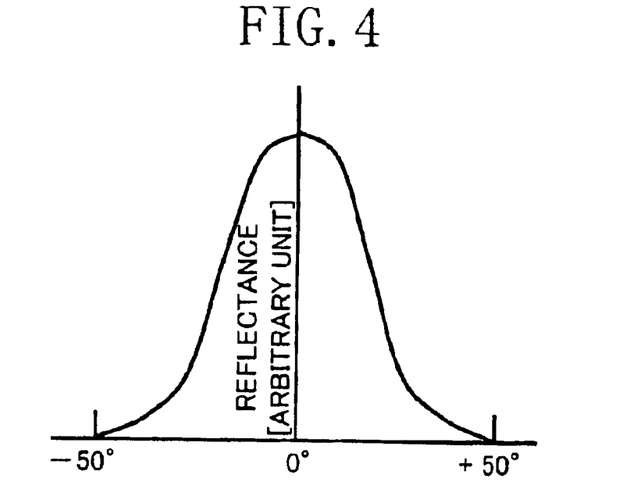
FIG. 4 shows angle dependence of the reflectance in the reflection-type LCD of the first embodiment.

On the other hand, according to the observation result of the reflection-type LCD of the present embodiment, reflected light from the liquid crystal layer 30b was scattered by the partition wall 70 and thus directed also in a direction other than the regular reflection direction. Accordingly, an excellent image was able to be recognized even if the reflection-type LCD of the present embodiment was viewed from a direction other than the regular reflection direction. FIG. 4 shows an example of angle dependence of the reflectance in the reflection-type LCD of the present embodiment.

Figure 5A:
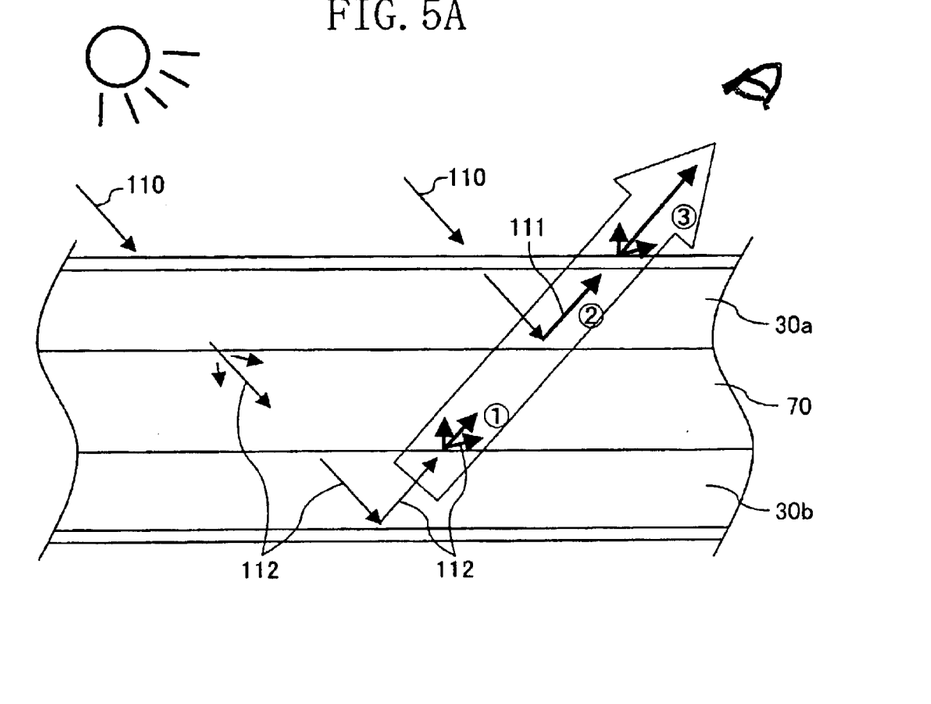
FIG. 5A illustrates principles of reflection in the reflection-type LCD of the first embodiment.
Figure 5B:
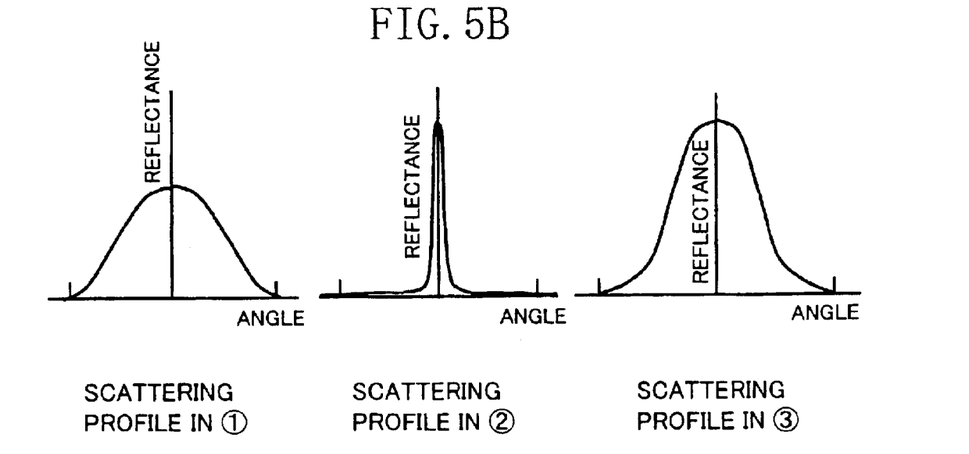
FIG. 5B schematically shows scattering profiles in ①, ② and ③ of FIG. 5A.

FIG. 5A illustrates principles of reflection in the reflection-type LCD of the present embodiment. FIG. 5B schematically shows scattering profiles in ①, ② and ③ of FIG. 5A. Of incident light 110, a left-handed circularly polarized light component 111 in a selective reflection wavelength range is reflected mainly in the regular reflection direction in a selective reflection layer located on the viewing side (i.e., liquid crystal layer 30a) ② in FIG. 5A). A right-handed circularly polarized light component 112 in a selective reflection wavelength range is reflected in a selective reflection layer located away from the viewing side (i.e., liquid crystal layer 30b) and then scattered in the partition wall 70 (① in FIG. 5A). Combined light of regularly reflected light 111 and scattered light 112 from these two layers is thus observed from the viewing side (③ in FIG. 5A). In order to provide excellent display, the partition wall 70 must have a higher scattering intensity than that required for a scattering layer which is provided on the top surface (the top surface on the viewing side) of a selective-reflection display device having a single selective reflection layer.

For comparison of the scattering level of the partition wall 70, two types of partition walls 70a, 70b having different scattering levels were fabricated in the following manner: a UV curable resin having fine particles of titanium oxide (particle size: 1.3 $\mu$m) dispersed therein at about $1.5 \times 10^{16}$/m$^3$ was applied with a thickness of 8 $\mu$m to a 7.5 $\mu$m-thick polyimide film by a spin coating method or the like. The resultant resin was then cured by UV light. The resultant film was then subjected to a vertical alignment process to form the partition wall 70a. The partition wall 70b was fabricated in the same manner except that fine particles of titanium oxide (particle size: 1.3 $\mu$m) were dispersed at about $2.3 \times 10^{16}$/m$^3$. Visibility and display quality were evaluated using the above three types of partition walls 70, 70a, 70b.

(Evaluation of Visibility)

Figure 6:
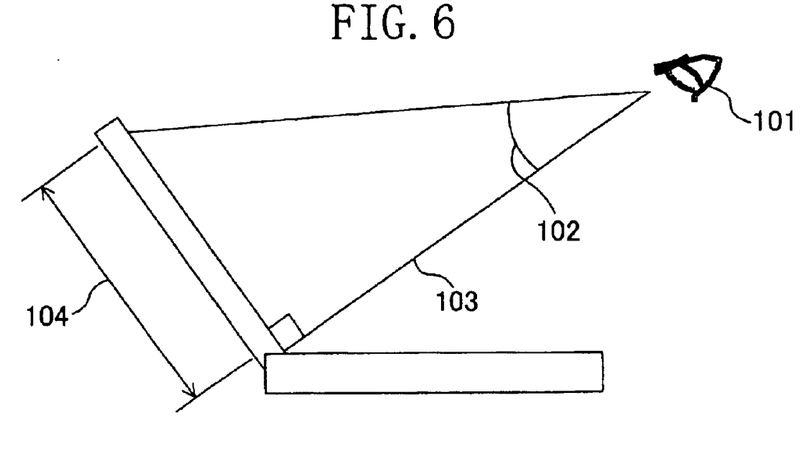
FIG. 6 shows the relation between a viewing angle and an observation distance.

In order to evaluate visibility, the influences of the viewing angle and the observation distance on visibility were examined. Reflection-type LCDs are often used as portable information display devices due to their characteristics. As shown in FIG. 6, a viewer 101 viewed the screen at a prescribed observation distance 103 away from one vertical end of the screen in the normal direction, and a viewing angle 102 that allowed the viewer 101 to see the other vertical end of the screen was calculated for each vertical length 104 of the screen. The result is shown in Table 1 below. Note that the observation distance was 40 cm and 50 cm. It can be seen from Table 1 that the viewing angle 102 is within 30° even in an LCD having a screen size of 15 inches (diagonal). If the screen size is smaller than 15 inches (diagonal) or the observation distance exceeds 50 cm, the viewing angle 102 is further reduced. It is appreciated from this result that a reflection-type LCD is practically applicable as long as excellent visibility is assured within about 30° from the regular reflection direction.

TABLE 1

| Diagonal (inch) | Vertical length (cm) | Viewing angle at observation distance of 40 cm (degree) | Viewing angle at observation distance of 50 cm (degree) |
|---|---|---|---|
| 11 | 16.5 | 22.4 | 18.3 |
| 12 | 18 | 24.2 | 19.8 |
| 13 | 19.5 | 26.0 | 21.3 |
| 14 | 21 | 27.7 | 22.8 |
| 15 | 22.5 | 29.4 | 24.2 |

The visibility evaluation test was conducted for the two-layer, reflection-type LCDs having the three types of partition walls 70, 70a, 70b, respectively. The partition wall 70 having the greatest scattering intensity exhibited excellent reflection scattering characteristics. Therefore, display was stable at every viewing angle. Moreover, since the reflectance changes gradually with a change in viewing angle, the recognized display texture was not like metallic luster but close to paper. The partition wall 70a having the smallest scattering intensity exhibited allowable scattering characteristics, although the recognized display texture was fairly like metallic luster. The partition wall 70b exhibiting intermediate scattering characteristics provided excellent display although there is a slight variation in reflectance within the screen.

The evaluation result is shown in Table 2 below. In Table 2, "⊙" indicates that visibility is excellent and display characteristics are stable at every viewing angle, "○" indicates that visibility is excellent and display characteristics are enough for practical applications, and "Δ" indicates that display characteristics are the allowable limit that allows the content of display to be visually recognized.

(Measurement of Average Scattered Light Intensity)

Figure 7:
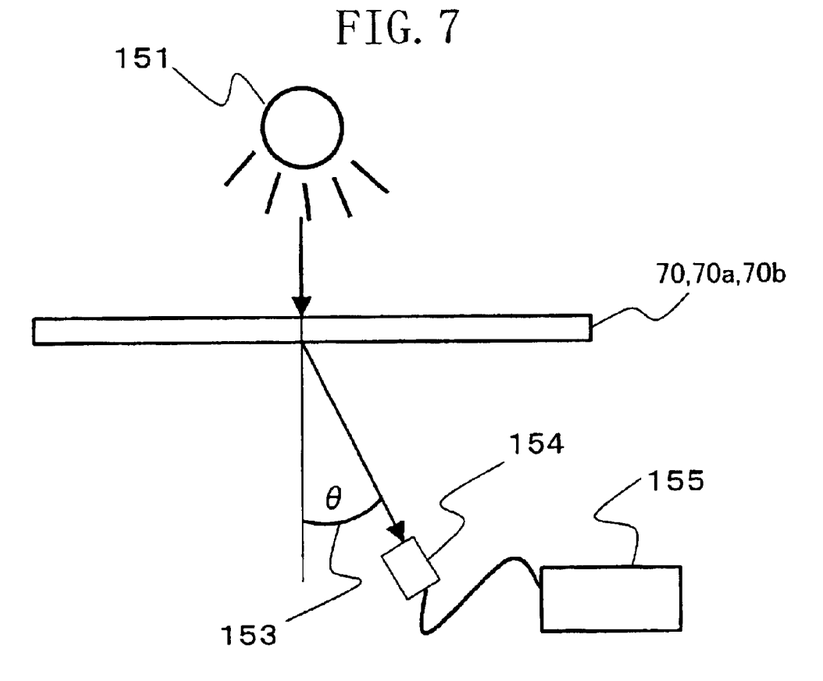
FIG. 7 illustrates a method for measuring scattering characteristics of a partition wall (scattering layer)

The scattered light intensity of the partition walls 70, 70a, and 70b within a prescribed angle was measured as shown in FIG. 7. More specifically, an average scattered light intensity of 0° to 10° (an average value of I (0°) to I (10°)) and an average scattered light intensity of 20° to 30° (an average value of I (20°) to I (30°)) were measured. The average scattered light intensity was obtained by integrating the scattered light intensity within each angle and dividing the resultant integral value by unit angle. The average scattered light intensity was thus obtained as an average scattered light intensity per unit angle. Provided that light traveling straight from a light source through the air is received with an intensity of 100, the scattered light intensity is a value relative to that intensity.

The scattered light intensity was measured with a light intensity-measuring device 155. As shown in FIG. 7, parallel light was emitted from a light source 151 to the partition walls 70, 70a, and 70b in the normal direction. A change in light intensity was measured while changing an angle 153 of a light-receiving element (optical sensor) 154. An average value of 10° was herein used as the average scattered light intensity in consideration of a CIE1964 color system at a viewing angle of 10°. CIE1964 is a standard that was created in view of the structure of a human eyeball because there is variation in data at a viewing angle of 2°. More specifically, in the central portion of the retina, nerves that selectively sense single-wavelength light are distributed with a diameter of about 10°. Therefore, a visually recognized image is different between a large viewing angle and a small viewing angle. The measurement result is shown in Table 2 below.

TABLE 2

| Partition Wall | 70a | 70b | 70 |
|---|---|---|---|
| Average scattered light intensity of 0° to 10° | 16.6 | 13.9 | 11.2 |
| Average scattered light intensity of 20° to 30° | 0.0162 | 0.0236 | 0.0314 |
| Ratio of average scattered light intensities | 1028.1 | 590.0 | 356.5 |
| Visibility evaluation | Δ | ○ | ⊙ |

It is appreciated from the above result that better visibility is obtained as the ratio of the average scattered light intensities is reduced. More specifically, the average value of I (0°) to I (10°) is preferably equal to or less than 500 times the average value of I (20°) to I (30°). The visibility is further improved as the average value of I (0°) to I (10°) is reduced like equal to or less than 400 times, 200 times, 100 times, 50 times, 30 times, 20 times, 10 times, and 5 times the average value of I (20°) to I (30°).

Figure 8A:
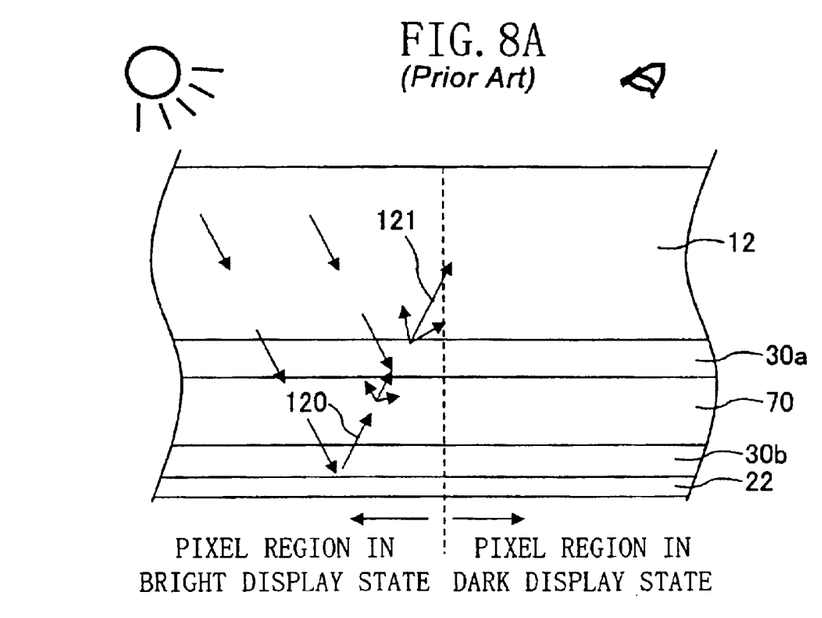
FIG. 8A is a cross-sectional view illustrating reflection display of the first embodiment.
Figure 8B:
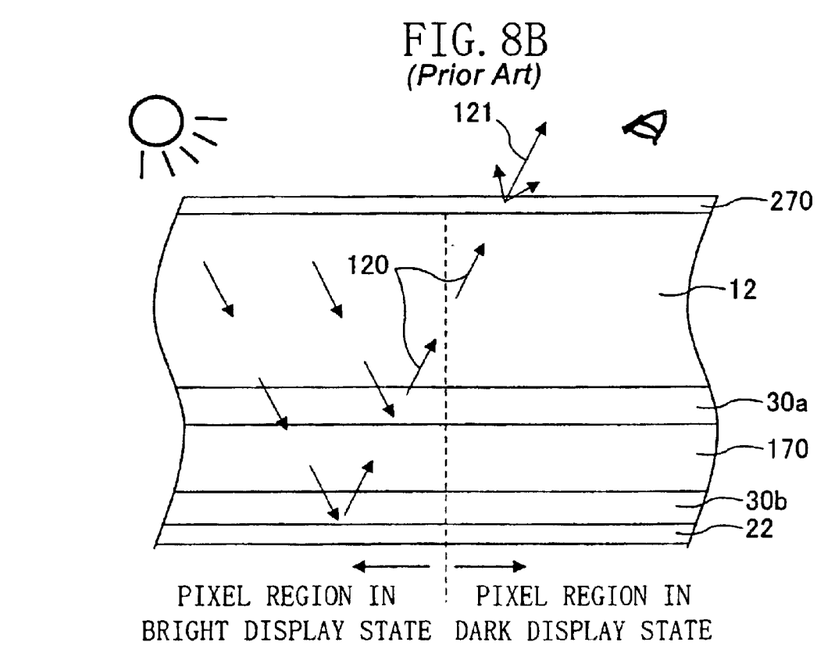
FIG. 8B is a cross-sectional view illustrating reflection display of a second comparative example.

Hereinafter, the effects obtained by providing the partition wall 70 as a scattering layer between the laminated cholesteric liquid crystal layers 30a, 30b will be described. FIG. 8A is a cross-sectional view illustrating reflection display of the present embodiment, and FIG. 8B is a cross-sectional view illustrating reflection display of a second comparative example. The reflection-type LCD of the second comparative example has a partition wall 170 between the liquid crystal layers 30a, 30b and a scattering layer 270 on the viewing side of a transparent substrate 12 (e.g., glass substrate). The partition wall 170 does not have a light scattering function. The display quality of the display device of the second comparative example will now be described.

As shown in FIG. 8B, since the scattering layer 270 is provided on the front surface of the transparent substrate 12, reflected light 120 from a pixel region which provides reflection display (bright display state) is scattered within an adjacent pixel region that does not provide reflection display (dark display state). Therefore, reflected light 121 is emitted from pixels in the dark display state and is viewed in combination with the reflected light 120 from pixels in the bright display state, thereby causing blurred or unclear display. In actual applications, the transparent substrate 12 often has a thickness of 100 μm or more in view of the strength. Therefore, blurred or unclear display is likely to be produced. In particular, such blurring and unclarity of display become more remarkable as the polar angle of incident light (a tilt angle with respect to the normal of the substrate) is increased. In other words, the second comparative example provides an extremely blurred, unclear image, which may possibly result in degraded display quality.

On the other hand, as shown in FIG. 8A, the display device of the present embodiment has the partition wall 70 with a light scattering function between the liquid crystal layers 30a, 30b. Therefore, reflected light 120 is scattered within a pixel region that provides reflection display (bright display state). Accordingly, reflected light 121 emitted from pixels in the bright display state to pixels in the dark display state is reduced as compared to the case of the second comparative example. As a result, blurred or unclear display is less likely to be produced, thereby providing a sharply defined image.

In the present embodiment, the vertical alignment layers 16, 27 are respectively formed on the transparent substrates 12, 22 and both surfaces of the partition wall 70 are subjected to a vertical alignment process. However, a horizontal alignment layer may be formed on each transparent substrate 12, 22 and both surfaces of the partition wall 70 may be subjected to a horizontal alignment process. Alternatively, a vertical alignment layer may be formed on each transparent substrate 12, 22 and both surfaces of the partition wall 70 may be subjected to a horizontal alignment process. On the contrary, a horizontal alignment layer may be formed on each transparent substrate 12, 22 and both surfaces of the partition wall 70 may be subjected to a vertical alignment process. For example, the horizontal alignment layer may be formed by applying AL4552 (made by JSR Corporation) by a spin coating method, baking the applied AL4552 at about 180° C. for about sixty minutes, and conducting a rubbing process to apply alignment regulation capability to align liquid crystal molecules in a specific azimuth direction.

Note that, if both surfaces of each liquid crystal layer 30a, 30b are horizontal alignment surfaces, a uniform, planar state is more likely to be obtained. As a result, selectively reflected light having a greater intensity in the regular reflection direction is obtained even if the cell thickness is small. If both surfaces of each liquid crystal layer 30a, 30b are vertical alignment surfaces, a planar state can be obtained with a reduced relaxation time in response to a voltage corresponding to a homeotropic state. This enables implementation of quick response. Moreover, since the selectively reflected light is scattered, excellent visibility is obtained. However, a too large ratio of the helical pitch to the cell thickness may hinder a planar state from being obtained. If one surface of each liquid crystal layer 30a, 30b is a vertical alignment surface and the other surface is a horizontal alignment surface, intermediate characteristics of the vertical alignment and horizontal alignment are obtained. Display texture like metallic luster is obtained when the display device is viewed from the horizontal alignment side, and scattering display is obtained when the display device is viewed from the vertical alignment side.

In the present embodiment, a polyimide film is used as the partition wall 70. However, a base material having flexural rigidity such as a thin glass plate may alternatively be used as the partition wall 70. In this case, commonly used spherical spacers may be dispersed instead of the columnar spacers in order to control the thickness of the liquid crystal layers 30a, 30b (cell gap).

(Second Embodiment)

In the first embodiment, a polyimide film having a resin layer with titanium oxide particles dispersed therein is used as the partition wall 70 in order to apply a light scattering function to the partition wall 70 so that the partition wall 70 forms a scattering layer. However, formation of the scattering layer is not limited to this. For example, the scattering layer may alternatively be formed by another method such as (1) performing a vertical alignment process to a partition wall (e.g., a transparent polyimide film), (2) performing no alignment process to the partition wall, (3) forming a vertical alignment layer on the partition wall, or (4) forming concaves and convexes at the surface of the partition wall. By these methods, liquid crystal molecules in contact with the partition wall (or alignment layer) in the liquid crystal layers are rendered in a vertically aligned state or a random state, and smaller liquid crystal domains of a planar state are produced in a bulk portion (the liquid crystal layer other than a region near the interface) or a partition wall portion (the liquid crystal layer near the interface). Disclination between the domains (domain wall) causes light scattering.

Note that the vertical alignment layers can be formed by a known method using a known material. When the partition wall is formed from a polyimide film, concaves and convexes may be formed at the surface of the partition wall by conducting surface treatment of the partition wall by a sandblasting device.

(Third Embodiment)

In the third embodiment, a reflection-type LCD was fabricated using a chiral nematic liquid crystal composition described below. The reflection-type LCD of the third embodiment was fabricated in the same manner as that of the first embodiment except the liquid crystal layers 30a, 30b.

Figure 9:
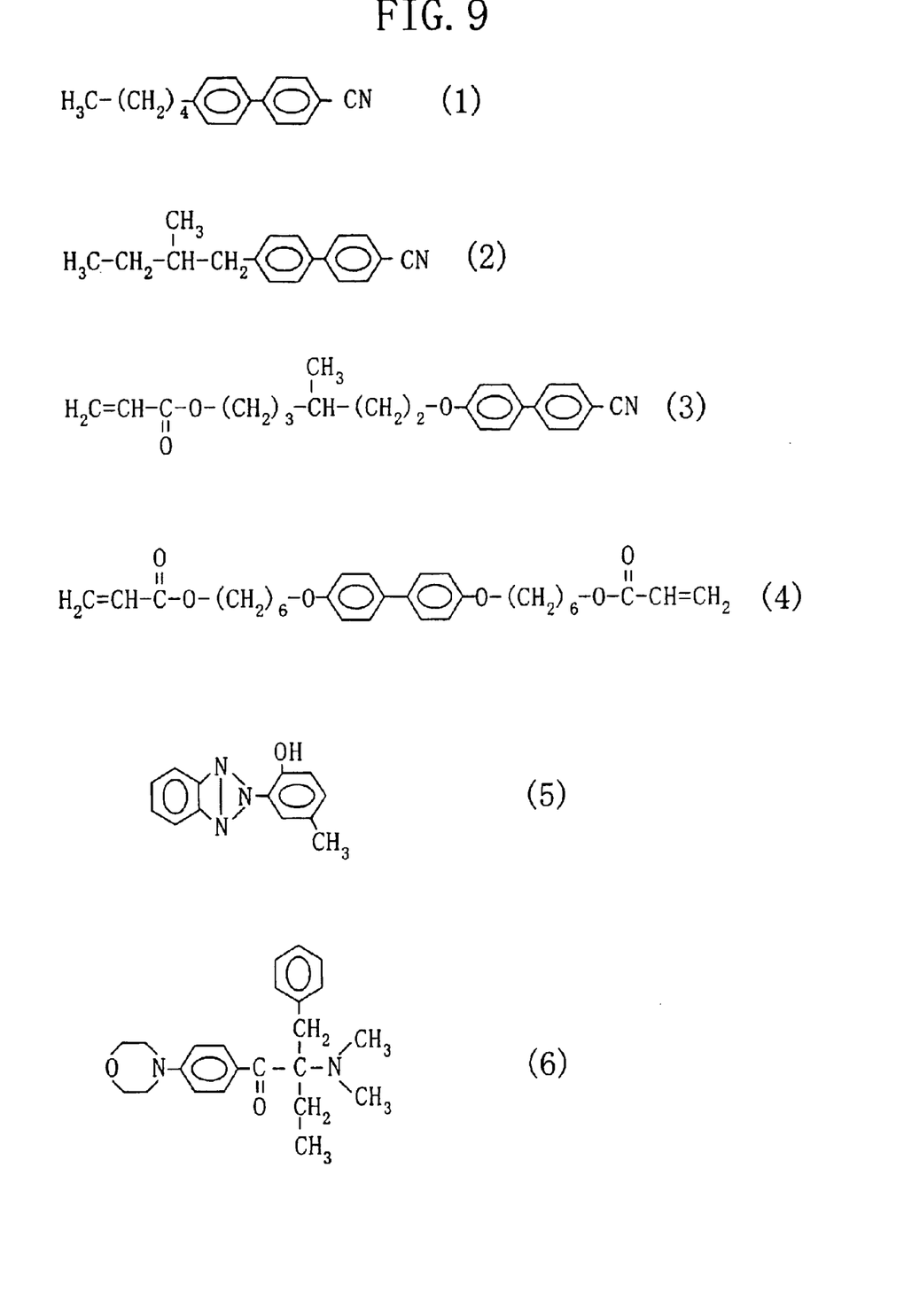
FIG. 9 shows structural formulas of materials of a liquid crystal composition used in a third embodiment of the present invention.

The liquid crystal composition used in the present embodiment was prepared by mixing the following compounds: (1) a low molecular weight liquid crystal material; (2) a low molecular weight chiral agent; (3) a chiral monoacrylate monomer; (4) diacrylate monomer; (5) an initiator; and (6) a UV absorbing dye. FIG. 9 shows the respective structural formulas of the above compounds (1) to (6). The mixing ratio of each compound is as follows: 39.5 wt % of low molecular weight liquid crystal material 5CB given by the structural formula (1); 19 wt % of chiral agent CB15 given by the structural formula (2); 40 wt % of chiral monomer given by the structural formula (3); 0.5 wt % of diacrylate monomer given by the structural formula (4); and 1 wt % of UV absorbing dye, TINUVIN P, given by the structural formula (5). As an initiator, two weight parts of IRGACURE 369 given by the structural formula (6) were added to 100 weight parts of the resultant mixture.

The mixture thus obtained was sufficiently uniformly diffused and mixed, and introduced into a liquid crystal cell of each liquid crystal layer 30a, 30b. It should be noted that, regarding (2) the low molecular weight chiral agent and (3) the chiral monoacrylate monomer, enantiomers were used. More specifically, enantiomers of (2) the low molecular weight chiral agent and (3) the chiral monoacrylate monomer mixed in the liquid crystal composition of the liquid crystal layer 30a are different from those mixed in the liquid crystal composition of the liquid crystal layer 30b. Thereafter, both sides of the first and second substrates 10, 20 were exposed to light for sixty minutes at an exposure intensity of 0.1 mW by a UV aligner. The liquid crystal layers 30a, 30b of the present embodiment were thus fabricated.

Figure 10:
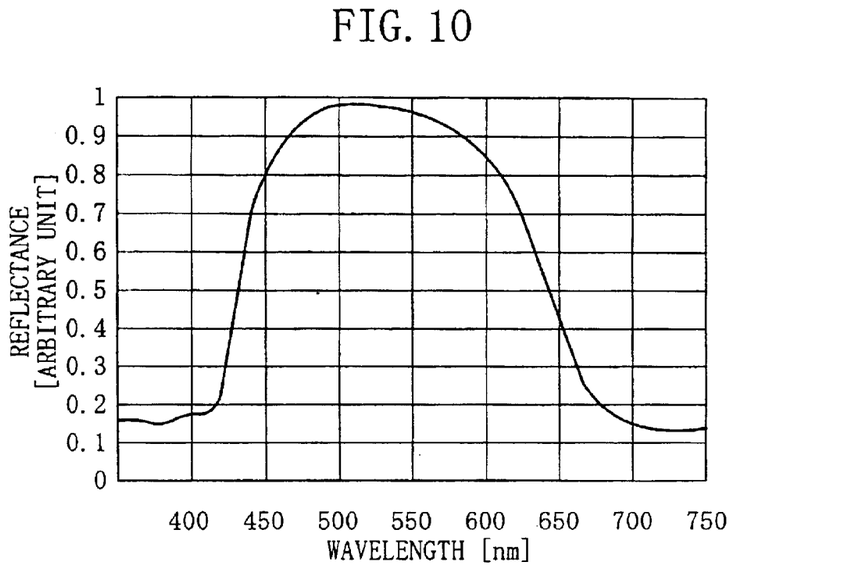
FIG. 10 shows wavelength dependence of reflected light in an LCD of the third embodiment.

FIG. 10 shows wavelength dependence of reflected light in the LCD of the present embodiment. FIG. 10 shows the measurement result of 12° regularly reflected light by spectrophotometer U-4100 made by Hitachi, Ltd. As shown in FIG. 10, in the present embodiment, a half value width of the wavelength of the reflected light (hereinafter, sometimes referred to as selective reflection wavelength) is about 200 nm, and a 50% selective reflection wavelength is in the range of about 430 nm to about 650 nm. In the LCD of the present embodiment, reflected light was present over a wide wavelength range of the entire visible light range, enabling implementation of excellent monochrome display.

Preferably, the half value width of the selective reflection wavelength is a wide wavelength range of the entire visible light range. More specifically, the half value width of the selective reflection wavelength is desirably 150 nm or more. However, even when the half value width of the selective reflection wavelength was 150 nm or more, yellowish display was provided as long as the lower limit of the 50% selective reflection wavelength was greater than 450 nm. Therefore, excellent monochrome display was not able to be implemented. Moreover, even when the half value width of the selective reflection wavelength was 150 nm or more, aeruginous display was provided as long as the upper limit of the 50% selective reflection wavelength was less than 600 nm. Therefore, excellent monochrome display was not able to be implemented. The 50% selective reflection wavelength is defined as a wavelength of reflected light at a reflectance of 50% or more when that the standardized maximum reflectance is 100%.

Regarding the color of white display, the color tone range that is recognized as white cannot be exactly defined because it is highly dependent on the difference between individuals and the color of illuminated light. However, the color tone of the display was almost white as long as the half value width of the selective reflection wavelength was 150 nm or more in the visible light range and the 50% selective reflection wavelength includes the range of 450 nm to 600 nm.

The selective reflection layer of the present embodiment is capable of providing monochrome display. Therefore, forming a color filter on the first substrate 10 of FIG. 1 enables color display to be provided in the same manner as that of a normal LCD.

(Fourth Embodiment)

In the first embodiment, the liquid crystal layer 30a selectively reflects left-handed circularly polarized light and the liquid crystal layer 30b selectively reflects right-handed circularly polarized light. However, the present invention is not limited to this. The liquid crystal layer 30a may selectively reflect right-handed circularly polarized light and the liquid crystal layer 30b may selectively reflect left-handed circularly polarized light. In the third embodiment, the liquid crystal layers 30a, 30b selectively reflect approximately the same wavelength range in order to improve light utilization efficiency in a specific wavelength range and thus improve color purity and luminance. However, the present invention is not limited to this. The liquid crystal layers 30a, 30b may selectively reflect different wavelength ranges. Alternatively, the respective wavelength ranges of the liquid crystal layers 30a, 30b may partially overlap each other, or one of the wavelength ranges may include the other.

In the present embodiment, each liquid crystal layer 30a, 30b is formed from a cholesteric liquid crystal composition so that the liquid crystal layers 30a, 30b have different selective reflection wavelengths. Forming the liquid crystal layers 30a, 30b from cholesteric liquid crystal compositions having different threshold voltages would enable implementation of four-color display whose display color varies depending on an applied voltage.

Figure 11:
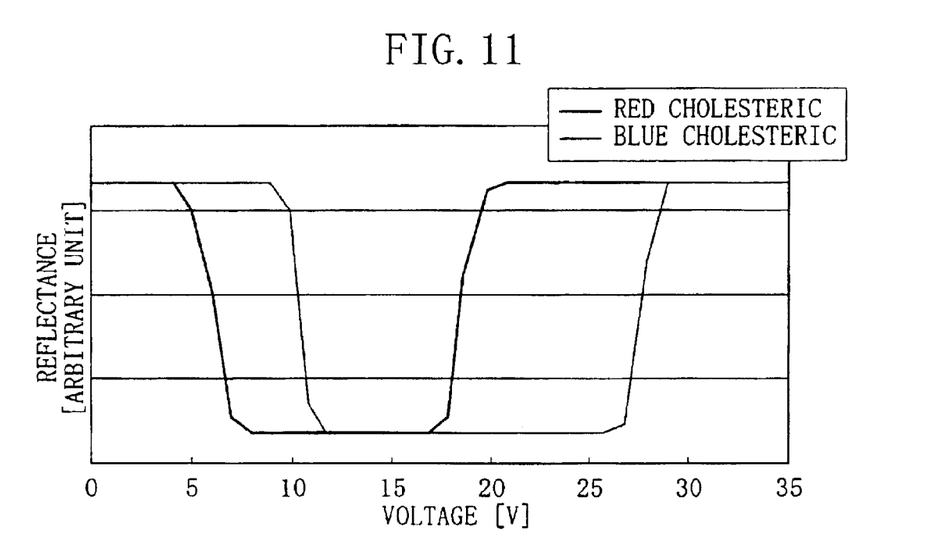
FIG. 11 shows the relation between a voltage and a reflectance, which was obtained when cholesteric liquid crystal compositions having different selective reflection wavelengths were used.

FIG. 11 shows the relation between a voltage and a reflectance, which was obtained when cholesteric liquid crystal compositions having different selective reflection wavelengths were respectively introduced into parallel alignment cells each having a thickness of 5 $\mu$m. A blue cholesteric liquid crystal composition having a selective reflection wavelength near 480 nm was introduced into one of the cells, and a red cholesteric liquid crystal composition having a selective reflection wavelength near 670 nm was introduced into the other cell. The blue cholesteric liquid crystal composition is a mixture of 70 wt % of MLC 14000-100 (made by Merck & Co., Inc) as a low molecular weight liquid crystal material and 30 wt % of chiral agent R811. The red cholesteric liquid crystal composition is a mixture of 79.3 wt % of MLC 14000-100 as a low molecular weight liquid crystal material and 20.7 wt % of chiral agent R811.

This relation between a voltage and a reflectance is the same as the relation between a divided voltage and a reflectance in each layer of a display device having a laminated structure. When a reset voltage of 60 V is applied to the laminated-type display device, a divided voltage of 30 V is applied to each of blue and red cholesteric liquid crystal layers, whereby both cholesteric liquid crystal layers are rendered in a planar state. Therefore, the display device provides violet display. When 44 V is applied to the display device, a divided voltage of 22 V is applied to each of the blue and red cholesteric liquid crystal layers. As a result, the blue cholesteric layer is rendered in a focal conic state and becomes transparent, whereas the read cholesteric layer is rendered in a planar state and becomes red. Therefore, the display device provides red display. When 30 V is applied to the display device, a divided voltage of 15 V is applied to each of the blue and read cholesteric liquid crystal layers, whereby both cholesteric liquid crystal layers are rendered in a focal conic state. Therefore, the display device provides black display by the light-absorbing layer 23 provided on the back surface of the second substrate 20. When 16 V is applied to the display device, a divided voltage of 8 V is applied to each of the blue and red cholesteric liquid crystal layers. As a result, the blue cholesteric layer is rendered in the planar state and becomes blue, whereas the red cholesteric layer is rendered in a focal conic state and becomes transparent. Therefore, the display device provides blue display. In this way, four-color display of violet, red, black and blue can be implemented. A display device having three layers would enable eight-color display.

In order to use both right-handed circularly polarized light and left-handed circularly polarized light in a wavelength region corresponding to red, green and blue for display, the present embodiment is also applicable in a preferable manner to a multi-color, reflection-type LCD having a laminated structure of six liquid crystal layers. It should be understood that the present embodiment is also applicable in a preferable manner to a full-color, reflection-type LCD having a laminated structure of more than six liquid crystal layers.

(Other Embodiments)

Instead of the chiral nematic liquid crystal material, a cholesteric liquid crystal material or a chiral smectic liquid crystal material having optically the same selective reflection characteristics as those of the cholesteric liquid crystal material can be used as the selective reflection layers (liquid crystal layers 30a, 30b). However, the cholesteric liquid crystal material is commonly unstable to a chemical atmosphere or UV light and therefore is less reliable. On the other hand, the chiral nematic liquid crystal material has excellent light resistance and is stable. Moreover, it is relatively easy to adjust the helical pitch and it is easy to adjust the half value width of a selective reflection wavelength. Moreover, a wide variety of materials can be used as the chiral nematic liquid crystal material. For these reasons, the chiral nematic liquid crystal material is commonly used in practical applications.

Holographic PDLC (polymer-dispersed liquid crystal material) may be used as the selective reflection layers. For example, a reflection-type holographic PDLC having a diffractive reflection function can be obtained as follows: 30 wt % of monoacrylate monomer and 2 wt % of diacrylate monomer is mixed with nematic liquid crystal material E7 (made by Merck & Co., Inc), and 2 wt % of photoinitiator is added to the resultant mixture. The liquid crystal composition thus obtained is phase-separated and polymerized by an interference exposure method using laser light. The holographic PDLC is produced by a known method described in, e.g., Jpn. J. Appl. Phys. Vol. 38 (1999), pp. 1466–1469 or Jpn. J. Appl. Phys. Vol. 38 (1999), pp. 805–808.

The reflection-type LCD of the present invention is applicable to every reflection-type LCD that utilizes selective reflection by a cholesteric structure such as broadband cholesteric whose helical pitch varies in the direction normal to the plane of a substrate.

In the first to fourth embodiments, the transparent electrodes 14, 24 are respectively provided at the surfaces of the substrates 10, 20 which face the liquid crystal layers 30a, 30b. However, arrangement of the transparent electrodes 14, 24 is not specifically limited as long as the alignment state of liquid crystal molecules can be varied by applying an electric field to the liquid crystal layers 30a, 30b. For example, the reflection-type LCD may be mounted on an electrode plate so that the alignment state of the liquid crystal molecules can be varied by bringing a pen-type electrode in contact with the screen of the LCD and thus applying an electric field to the liquid crystal layers.

The reflection-type LCD of the present invention provides excellent visibility not only in the regular reflection direction but also in a wide viewing-angle range. Since the reflectance changes gradually with a change in viewing angle, metallic luster of the display texture is suppressed. Moreover, variation in hue is small even at a large viewing angle. Moreover, the partition wall or the alignment layer provides a light scattering function. This eliminates the need to form a separate scattering layer, whereby increase in the number of parts, the number of steps in the manufacturing process and the manufacturing costs can be suppressed.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A reflection-type liquid crystal display device, comprising:

at least two liquid crystal layers for selectively reflecting light in a specific wavelength range; and at least one partition wall interposed between the at least two liquid crystal layers so as to separate the liquid crystal layers from each other, wherein any one of the partition wall, a part of the liquid crystal layer which contacts the partition wall, and a part of the liquid crystal layer which contacts an alignment layer laminated to the partition wall serves as a scattering layer having a light scattering function.

2. The reflection-type liquid crystal display device according to claim 1, wherein the scattering layer is formed by any one of the following methods (1) to (4): (1) performing a vertical alignment process to the partition wall; (2) performing no alignment process to the partition wall; (3) forming a vertical alignment layer on the partition wall; and (4) forming concaves and convexes at a surface of the partition wall.

3. The reflection-type liquid crystal display device according to claim 1, wherein a half value width of a selective reflection wavelength is 150 nm or more in a visible light range, and a 50% selective reflection wavelength includes a range of 450 nm to 600 nm.

4. The reflection-type liquid crystal display device according to claim 1, wherein the at least two liquid crystal layers are two or three liquid crystal layers, and the liquid crystal layers selectively reflect different specific wavelength ranges and have different threshold voltages.

5. The reflection-type liquid crystal display device according to claim 1, wherein a scattered light intensity I (θ) of the scattering layer is distributed such that an average value of I (0°) to I (10°) is equal to or less than 500 times an average value of I (20°) to I (30°).

6. The reflection-type liquid crystal display device according to claim 1, wherein a scattered light intensity I (θ) of the scattering layer is distributed such that an average value of I (0°) to I (10°) is equal to or less than 400 times an average value of I (20°) to I (30°).

7. The reflection-type liquid crystal display device according to claim 1, wherein a scattered light intensity I (θ) of the scattering layer is distributed such that an average value of I (0°) to I (10°) is equal to or less than 200 times an average value of I (20°) to I (30°).

8. The reflection-type liquid crystal display device according to claim 1, wherein a scattered light intensity I (θ) of the scattering layer is distributed such that an average value of I (0°) to I (10°) is equal to or less than 100 times an average value of I (20°) to I (30°).

9. The reflection-type liquid crystal display device according to claim 1, wherein a scattered light intensity I (θ) of the scattering layer is distributed such that an average value of I (0°) to I (10°) is equal to or less than 50 times an average value of I (20°) to I (30°).

10. The reflection-type liquid crystal display device according to claim 1, wherein a scattered light intensity I (θ) of the scattering layer is distributed such that an average value of I (0°) to I (10°) is equal to or less than 30 times an average value of I (20°) to I (30°).

11. The reflection-type liquid crystal display device according to claim 1, wherein a scattered light intensity I (θ) of the scattering layer is distributed such that an average value of I (0°) to I (10°) is equal to or less than 20 times an average value of I (20°) to I (30°).

12. The reflection-type liquid crystal display device according to claim 1, wherein a scattered light intensity I (θ) of the scattering layer is distributed such that an average value of I (0°) to I (10°) is equal to or less than 10 times an average value of I (20°) to I (30°).

13. The reflection-type liquid crystal display device according to claim 1, wherein a scattered light intensity I (θ) of the scattering layer is distributed such that an average value of I (0°) to I (10°) is equal to or less than 5 times an average value of I (20°) to I (30°).

14. The reflection-type liquid crystal display device according to claim 1, wherein the liquid crystal layers are chiral nematic liquid crystal layers or holographic polymer-dispersed liquid crystal layers.

* * * * *